US008394172B2

(12) United States Patent
Bierl et al.

(10) Patent No.: US 8,394,172 B2
(45) Date of Patent: Mar. 12, 2013

(54) METHOD FOR RAPIDLY EMPTYING THE ACTIVATED CARBON FILTER WHILE USING AN HC SENSOR (CONCENTRATION CHANGE)

(75) Inventors: Rudolf Bierl, Regensburg (DE); Stephan Heinrich, Pfeffenhausen (DE); Wolfgang Mai, Kronberg (DE); Paul Rodatz, Landshut (DE); Manfred Weigl, Viehhausen (DE); Andreas Wildgen, Nittendorf (DE)

(73) Assignee: Continental Automotive GmbH, Hannover (DE)

( * ) Notice: Subject to any disclaimer, the term of this patent is extended or adjusted under 35 U.S.C. 154(b) by 206 days.

(21) Appl. No.: 13/055,318

(22) PCT Filed: Jul. 15, 2009

(86) PCT No.: PCT/EP2009/059052

§ 371 (c)(1), (2), (4) Date: Feb. 17, 2011

(87) PCT Pub. No.: WO2010/010019

PCT Pub. Date: Jan. 28, 2010

(65) Prior Publication Data

US 2011/0226804 A1 Sep. 22, 2011

(30) Foreign Application Priority Data

Jul. 24, 2008 (DE) ......................... 10 2008 034 487

(51) Int. Cl.
*B01D 53/04* (2006.01)
*F02M 25/08* (2006.01)

(52) U.S. Cl. ................. 95/12; 95/146; 96/111; 123/520

(58) Field of Classification Search .......... 123/518–520; 96/111; 95/8, 11, 12, 143, 146
See application file for complete search history.

(56) References Cited

U.S. PATENT DOCUMENTS

| | | | | |
|---|---|---|---|---|
| 4,318,383 | A * | 3/1982 | Iritani et al. | 123/520 |
| 5,572,981 | A * | 11/1996 | Pfleger et al. | 123/698 |
| 5,735,255 | A | 4/1998 | Farmer et al. | |
| 5,858,034 | A * | 1/1999 | Shida et al. | 55/313 |
| 6,227,177 | B1 | 5/2001 | Yamafuji et al. | |
| 6,237,575 | B1 | 5/2001 | Lampert et al. | |
| 6,453,887 | B1 * | 9/2002 | Hayashi et al. | 123/520 |
| 6,499,476 | B1 * | 12/2002 | Reddy | 123/704 |
| 6,830,040 | B1 * | 12/2004 | Toyoda | 123/520 |
| 7,347,194 | B2 * | 3/2008 | Sato | 123/520 |
| 7,866,424 | B2 | 1/2011 | Sauvlet et al. | |

(Continued)

FOREIGN PATENT DOCUMENTS

| | | |
|---|---|---|
| DE | 195 09 310 | 9/1996 |
| DE | 10 2007 002188 | 7/2008 |

(Continued)

*Primary Examiner* — Frank Lawrence, Jr.
(74) *Attorney, Agent, or Firm* — Cozen O'Connor

(57) ABSTRACT

A method for rapidly emptying an activated carbon filter while using an HC sensor (concentration change). A device for a tank system, for a motor vehicle having the device for a tank system and to a method for emptying an activated carbon filter for a tank system. The concentration of volatile components which are flushed from the activated carbon filter is detected by a concentration sensor. The concentration sensor is used as an early warning sensor to prevent any disturbances of mixture production of an engine.

15 Claims, 2 Drawing Sheets

U.S. PATENT DOCUMENTS

| | | | | |
|---|---|---|---|---|
| 7,942,134 | B2 * | 5/2011 | Peters et al. | 123/520 |
| 8,108,121 | B2 * | 1/2012 | Mai et al. | 701/103 |
| 2002/0162457 | A1 | 11/2002 | Hyodo et al. | |
| 2008/0179121 | A1 | 7/2008 | Sauvlet et al. | |
| 2010/0186482 | A1 | 7/2010 | Bierl et al. | |

FOREIGN PATENT DOCUMENTS

| | | |
|---|---|---|
| JP | 2004 156495 | 6/2004 |
| WO | WO 00/61937 | 10/2000 |
| WO | WO 2009/010102 | 1/2009 |

* cited by examiner

METHOD FOR RAPIDLY EMPTYING THE ACTIVATED CARBON FILTER WHILE USING AN HC SENSOR (CONCENTRATION CHANGE)

PRIORITY CLAIM

This is a U.S. national stage of Application No. PCT/EP2009/059052, filed on Jul. 15, 2009, which claims priority to German Application No: 10 2008 034 487.7, filed: Jul. 24, 2008, the contents of which are incorporated herein by reference.

BACKGROUND OF THE INVENTION

1. Field of the Invention

The invention relates to an apparatus for a tank system, to a motor vehicle having an apparatus for a tank system and to a method for emptying an activated carbon filter for a tank system.

2. Related Art

A tank system, in particular the tank system of a motor vehicle, usually has an activated carbon filter for filtering volatile fuel components, for example hydrocarbon emissions (HC). Since the activated carbon filter has a particular uptake capacity, it must be regenerated. If the uptake capacity is exceeded, the volatile fuel components pass the activated carbon filter and enter the environment. The activated carbon filter is usually regenerated in the motor vehicle using fresh air during the journey. After the fresh air has flowed through the activated carbon filter, it is supplied to an intake section of an engine. A lambda sensor arranged in the exhaust gas stream of the engine detects the ratio of air to fuel and transmits this ratio to the control device. The hydrocarbon emissions (HC) can be determined from the ratio determined. The control device then regulates the flow of air through the activated carbon filter on the basis of these values.

One disadvantage of this method is the delayed response of the control device. If the motor vehicle is shaken, for example by a curb, a relatively large number of hydrocarbons are emitted in the fuel tank. These hydrocarbons enter the activated carbon filter, which is purged at a constant flow rate. Since the concentration of hydrocarbons in the activated carbon filter has increased but the flow rate remains constant, the concentration of hydrocarbons purged from the activated carbon filter increases. This gas with a higher hydrocarbon concentration is now supplied to the engine. This results in a disturbance in the mixture formation process and thus in a disturbance in the combustion process. The lambda sensor in the exhaust gas stream detects the change in the combustion mixture only after combustion and can then transmit this change to the control device to reduce the flow rate through the activated carbon filter.

A resultant disadvantage is that the flow rate is below the maximum flow rate. If the flow through the activated carbon filter took place at the maximum possible flow rate in this method, this would result in an even more unfavorable mixture formation process in the event of shaking. This may result the mixture no longer being able to be ignited and in the engine stopping.

Another disadvantage of this method is that it is not suitable for motor vehicles having a start/stop function and vehicles with a hybrid drive. This is due to the fact that the regeneration of the activated carbon filter is restricted as a result of the phases in which the engine does not run.

SUMMARY OF THE INVENTION

An object of the present invention is to optimize the method for regenerating an activated carbon filter in comparison with the prior art.

The apparatus according to one embodiment of the invention for a tank system has the following features: an activated carbon filter which can take up volatile fuel components, in particular hydrocarbons (HC), a supply line for the volatile fuel components, a purge gas apparatus which can be used to supply a purge gas, in particular air, to the activated carbon filter, an outlet line having a valve, which line can be used to discharge volatile fuel components from the activated carbon filter using purge gas and the valve of which is connected to a control device, whereas a concentration sensor for volatile fuel components is arranged in the outlet line in order to provide purging of the activated carbon filter in conjunction with the control device.

An activated carbon filter is purged or emptied on the basis of a concentration sensor which is connected to a control device. The concentration sensor is arranged in the outlet line of the activated carbon filter. The concentration sensor advantageously detects the concentration and/or concentration change of the volatile components. Such an HC sensor is described in WO 2009/010102.

The concentration sensor transmits the detected values or changes to the control device. A valve which is also connected to the control device is additionally arranged in the outlet line. The control device can thus address the valve on the basis of the values detected by the concentration sensor. For example, the valve can be partially or completely closed on the basis of an increase in concentration.

If this apparatus is used in a motor vehicle, the responsiveness is faster in comparison with conventional systems and results as an advantage of this apparatus. A disturbance in the mixture formation process is thus prevented by correcting the injection quantity at the correct time and the flow through the activated carbon filter is achieved at the maximum flow rate. If such a system is used in a vehicle having a start/stop function or a hybrid drive, the activated carbon filter can be completely regenerated in this case too on the basis of controlled purging of the activated carbon filter.

In one advantageous embodiment, the apparatus comprises a tank, in particular for storing fuel that is connected to the supply line of the activated carbon filter and a valve which is arranged on the purge gas apparatus of the activated carbon filter. This valve is also connected to the control device. This structure makes it possible to purge the activated carbon filter in a targeted manner since the control device can now address both valves on the basis of the values detected by the concentration sensor.

The arrangement of the concentration sensor in the outlet line upstream of the valve is also advantageous. This makes it possible to close the valve before the gas with a higher concentration of a volatile component flows through. If this apparatus is used in a motor vehicle, the concentration change does not have a disruptive effect on the mixture formation process in the engine.

In another advantageous embodiment, the concentration sensor is arranged in the outlet line downstream of the valve. This makes it possible to set the apparatus to a particular concentration rate. If this embodiment is used in the motor vehicle, limitation to a predefined concentration that must not be exceeded can thus be implemented.

In another advantageous embodiment, the control device controls the valves connected to it on the basis of the values detected by the concentration sensor. For example, an increase in concentration causes the valve in the purge line and/or in the outlet line to be closed. One of the valves or both valves is/are then opened again, for example after a predefined amount of time has elapsed.

The regulation of the two valves on the basis of the concentration detected by the concentration sensor is also advantageous. One advantage is the monitoring of the concentration or concentration change in the outlet line and the regulation of the valves that is directly coupled thereto. This makes it possible to continuously correct the valve position and adapt it to the respective conditions. This achieves a faster response in comparison with conventional apparatuses with a higher flow rate through the activated carbon filter.

A motor vehicle according to the invention has an above-described apparatus for a tank system. On account of the fact that the tank system according tone embodiment of the invention is used inside a motor vehicle, the motor vehicle also has all of the advantages described above.

A lambda sensor in the motor vehicle, which is connected to the control device, is also advantageous. This is particularly advantageous when the concentration sensor detects a concentration change. The lambda sensor is used to determine the ratio of air to fuel and to transmit this ratio to the control device. The hydrocarbon emission can be determined on this basis. The control device can control one of the valves or both valves in a targeted manner using the detected concentration change and the emission value.

The method according to the invention for emptying an activated carbon filter for a tank system comprises the following:

- volatile components, in particular hydrocarbons (HC), are filtered in an activated carbon filter,
- a purge gas flows through the activated carbon filter,
- a concentration sensor is used to detect a concentration and/or a concentration change of the volatile component in an outlet line of the activated carbon filter, and
- the concentration and/or the concentration change in the concentration sensor is/are transmitted to a control device in order to provide purging of the activated carbon filter in conjunction with the control device.

The emptying method according to one embodiment of the invention regenerates the activated carbon filter of an apparatus according to the invention of a tank system. Regeneration completely or partially empties the activated carbon filter. The volatile components collected in the activated carbon filter are accordingly completely or partially purged. During operation, the activated carbon filter filters volatile components, in particular hydrocarbons (HC). In order to avoid the volatile components penetrating the activated carbon filter, a purge gas flows through the activated carbon filter. The concentration and/or concentration change of the volatile component is/are detected by a concentration sensor in the outlet apparatus of the activated carbon filter. The sensor transmits the detected values to a control device. This control device regenerates the activated carbon filter on the basis of the values detected by the concentration sensor.

The control device advantageously controls the valve in the purge line and/or in the outlet line of the activated carbon filter, for example closes the valve in the outlet line of the activated carbon filter on account of an increase in the concentration of volatile components, which increase was detected by the concentration sensor.

In another advantageous embodiment of the method, the control device regulates the position of one of the valves or both valves on the basis of the values detected by the concentration sensor. Targeted purging and the setting to a predefined concentration of the volatile component in the gas downstream of the activated carbon filter can thus be achieved.

The control device advantageously uses the air/fuel ratio detected by a lambda sensor to determine the emissions. Whereas the concentration sensor detects changes in the concentration and the control device closes a valve on account of an increase in concentration. The values transmitted by the lambda sensor are used to detect a fall in the concentration of hydrocarbons. The control device can then open the valves again in order to allow a flow through the activated carbon filter. If the concentration sensor also detects a concentration the values from the concentration sensor and the values based on the air/fuel ratio detected by the lambda sensor can be compared in the control device. It is thus possible to carry out a corresponding control process which achieves the highest possible flow rate with little disturbance in the mixture formation process.

BRIEF DESCRIPTION OF DRAWINGS

The present invention is explained below using a preferred embodiment with reference to the accompanying drawing. This embodiment comprises a motor vehicle in which the apparatus for a tank system is mounted. In the drawings.

DETAILED DESCRIPTION OF THE DRAWINGS

Figure 1:
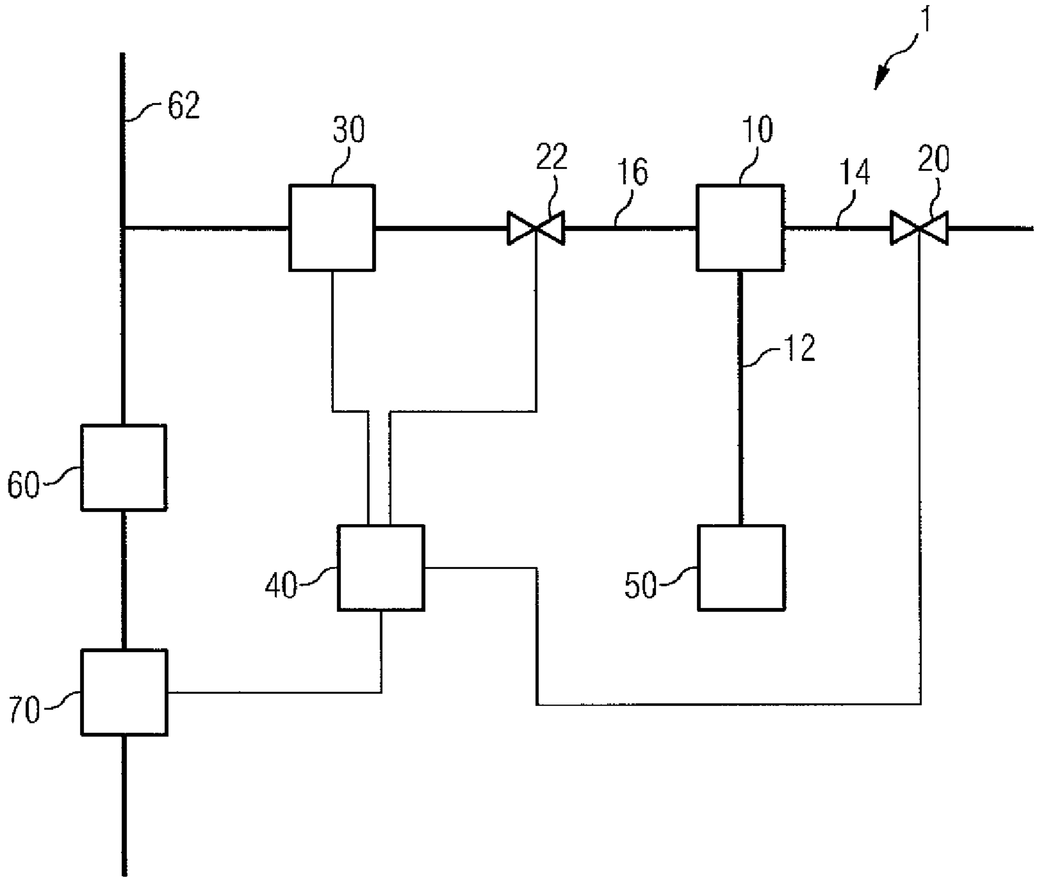
FIG. 1 is a schematic illustration of an embodiment of an apparatus for a tank system.

FIG. 1 schematically illustrates a preferred embodiment of the apparatus according to the invention for a tank system 1. The tank system 1 is part of a motor vehicle.

The apparatus for a tank system 1 comprises an activated carbon filter 10 with a supply line 12 for volatile components, a purge gas apparatus 14, an outlet line 16 with a valve 22, and a concentration sensor 30 which is connected to a control device 40. If volatile components pass, via the supply line 12, from a fuel tank 50 into the activated carbon filter 10, they are filtered and accumulate there. Since the activated carbon filter 10 can take up only a particular quantity of volatile components, it is necessary to purge or empty the activated carbon filter 10 in order to avoid penetration of the volatile components. This is effected using a purge gas apparatus 14 in which a valve 20 is preferably located. If a gas, in particular air, is supplied to the activated carbon filter 10 via this purge gas apparatus, the gas which is now loaded with volatile components leaves the activated carbon filter 10 via the outlet line 16. A concentration sensor 30 for the volatile components, for example a hydrocarbon sensor, is located in the outlet line 16. Sensor 30 may be arranged upstream or downstream of the valve 22. The outlet line 16 is connected to the intake line 62 of an engine 60. A lambda sensor 70 is located downstream of the engine in the exhaust gas stream of the engine. The lambda sensor 70 determines the air/fuel ratio in the exhaust gas stream of the engine and transmits the values to the control device 40. A statement can be made on the hydrocarbon emissions on the basis of this ratio.

If the tank 50 is shaken during operation, more hydrocarbon is emitted. Since purge gas typically flows through the activated carbon filter at an unchanged rate, the concentration of hydrocarbon in the outlet line 16 increases. This increase is detected by the concentration sensor 30 and is transmitted to the control device 40. The control device then completely or partially closes the valve 20 and/or the valve 22 for a particular period of time.

Another option is to regulate the flow through the activated carbon filter 10. The aim of this is to keep the concentration of hydrocarbon in the outlet line 16 at a predefined value. The predetermined value is stored in the control device 40, for example. The lambda sensor 70 arranged downstream of the engine 60 is additionally used for checking purposes. The valves 20, 22 are addressed on the basis of the determined concentrations. The concentration sensor 30 is used as a fore-warning sensor in order to check whether the extent to which the valves 20, 22 were opened or closed was too large. This makes it possible to achieve a high flow rate through the activated carbon filter 10 without resulting in disturbances in the mixture formation process in the engine 60.

Figure 2:
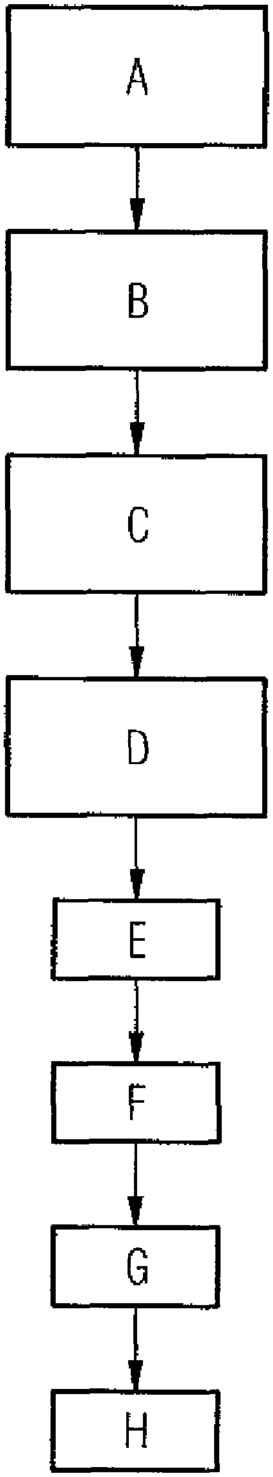
FIG. 2 is a flow chart diagram of a method for cleaning an activated carbon filter for a tank system.

FIG. 2 is a flowchart of a preferred embodiment of the method according to the invention. On the basis of the above-described apparatus for a tank system, the method is explained below In step A, the volatile components are filtered in an activated carbon filter 10. In step B, a purge gas, in particular air, flows through the activated carbon filter 10 and the carbon filter 10 is completely or partially emptied thereby. The concentration of the volatile components in the purge gas downstream of the activated carbon filter 10 is detected using a concentration sensor 30 (step C). In step D, these values are transmitted to a control device 40. Purging of the activated carbon filter is thus provided via the concentration sensor in conjunction with the control device 40.

The flow through the activated carbon filter 10 or purging of the activated carbon filter 10 can optionally be regulated or controlled. If the flow through the activated carbon filter 10 is controlled, the valve 22 in the outlet line 16 and/or the valve 20 in the purge apparatus 14 is/are closed when an increase in concentration is detected or a particular concentration value is exceeded and is/are opened only after a particular time irrespective of the concentration change which is now detected.

Alternatively, one of the valves 20, 22 or both valves 20, 22 is/are regulated on the basis of the concentration change or concentration detected by the concentration sensor 30. For example, the valves 20, 22 are closed when an increase in concentration is detected. As soon as the concentration sensor 30 detects a fall in the concentration, the valves 20, 22 are opened to such an extent that the concentration does not fall any further but does not rise again either. Alternatively or additionally, a comparison with desired concentration values can be carried out in the control device. This makes it possible to adapt the purge gas rate to the values measured by the concentration sensor 30 in a targeted manner.

Determination (step E) of the air/fuel ratio by a lambda sensor 70 is also advantageous. These values are transmitted to the control device 40 in step F. The hydrocarbon emissions can be determined (step G) on the basis of this ratio. In step H, these emissions can be compared with the values detected by the concentration sensor 30. It is optionally possible to both control and regulate the flow through the activated carbon filter 10 on the basis of this comparison.

For example, the concentration sensor 30 detects the change in concentration and the lambda sensor 70 is used to determine the value of the hydrocarbon emissions. A threshold value for the hydrocarbon emission is stored in the control device 40. If the concentration sensor 30 detects a rise in concentration, the valves 20, 22 are closed. If the hydrocarbon emission determined on the basis of the air/fuel ratio transmitted by the lambda sensor 70 is below the threshold value, the valves 20, 22 are opened and the rise in concentration is detected by the concentration sensor 30 again. The valves 20, 22 are closed again or the throughflow is continued depending on the extent of the rise.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An apparatus for a tank system, comprising:

a control device;

a supply line for volatile fuel components;

an activated carbon filter to absorb the volatile fuel components from the supply line;

a purge gas line configured to supply a purge gas to the activated carbon filter;

a first valve coupled to the control device;

an outlet line having the valve arranged therein configured to discharge the volatile fuel components from the activated carbon filter using the purge gas and the first valve;

a concentration sensor arranged in the outlet line and coupled to the control device configured to detect a concentration of volatile fuel components; and a second valve arranged in the purge gas line configured to be one of controlled and regulated in response to at least one of a concentration of the volatile fuel components and a concentration change of the volatile fuel components.

2. The apparatus as claimed in claim 1, wherein the concentration sensor detects the at least one of the concentration of the volatile fuel components and the concentration change of the volatile fuel components.

3. The apparatus as claimed in claim 1, further comprising:

a tank configured to store fuel to which the supply line is connected.

4. The apparatus as claimed in claim 2, wherein the concentration sensor is arranged in the outlet line at least one of upstream and downstream of the first valve.

5. The apparatus as claimed in claim 4, wherein the first valve is one of controlled and regulated based at least in part on the at least one of the concentration of the volatile fuel components and the concentration change of the volatile fuel components.

6. A motor vehicle having an apparatus for a tank system comprising:

a control device;

a supply line for volatile fuel components;

an activated carbon filter that can take up the volatile fuel components from the supply line;

a purge gas line configured to supply a purge gas to the activated carbon filter;

a first valve coupled to the control device;

an outlet line having the valve arranged therein configured to discharge the volatile fuel components from the activated carbon filter using the purge gas and the first valve;

a concentration sensor arranged in the outlet line and coupled to the control device configured to detect a concentration of volatile fuel components; and a second valve arranged in the purge gas line configured to be one of controlled and regulated in response to at least one of a concentration of the volatile fuel components and a concentration change of the volatile fuel components.

7. The motor vehicle as claimed in claim 6, further comprising a lambda sensor connected to the control device arranged in an exhaust gas stream of an engine.

8. A method for emptying an activated carbon filter for a tank system, comprising:

filtering volatile fuel components in an activated carbon filter;

flowing a purge gas through the activated carbon filter;

detecting by a concentration sensor at least one of a concentration of the volatile fuel components and a concentration change of the volatile fuel components in an outlet line of the activated carbon filter;

transmitting the at least one of the concentration of the volatile fuel components and the concentration change of the volatile fuel components from the concentration sensor to a control device;

purging the activated carbon filter controlled at least in part by the control device; and at least one of controlling and regulating a valve arranged in a purge gas line based at least in part on the at least one of the concentration of the volatile fuel components and the concentration change of the volatile fuel components.

9. The emptying method as claimed in claim 8, further comprising at least one of controlling and regulating a valve in the outlet line based at least in part on the at least one of the concentration of the volatile fuel components and the concentration change of the volatile fuel components.

10. The emptying method as claimed in claim 8, further comprising:

determining an air/fuel ratio with a lambda sensor;

transmitting the air/fuel ratio to the control device;

determining hydrocarbon emissions based at least in part on the air/fuel ratio transmitted by the lambda sensor; and comparing the at least one of the concentration of the volatile fuel components and the concentration change of the volatile fuel components with the hydrocarbon emissions to determine the flow of purge gas through the activated carbon filter.

11. The emptying method as claimed in claim 10, wherein the flow through the activated carbon filter is controlled based at least in part on the air/fuel ratio detected by the lambda sensor and the at least one of the concentration of the volatile fuel components and the concentration change of the volatile fuel components.

12. The emptying method as claimed in claim 11, wherein the flow through the activated carbon filter is regulated based at least in part on the air/fuel ratio detected by the lambda sensor and the concentration sensor.

13. The emptying method as claimed in claim 9, further comprising:

determining an air/fuel ratio with a lambda sensor;

transmitting the air/fuel ratio to the control device;

determining hydrocarbon emissions based at least in part on the air/fuel ratio transmitted by the lambda sensor; and comparing the at least one of the concentration of the volatile fuel components and the concentration change of the volatile fuel components with the hydrocarbon emissions to determine the flow of purge gas through the activated carbon filter.

14. The emptying method as claimed in claim 13, wherein the flow through the activated carbon filter is controlled based at least in part on the air/fuel ratio detected by the lambda sensor and the at least one of the concentration of the volatile fuel components and the concentration change of the volatile fuel components.

15. The motor vehicle as claimed in claim 1, wherein the volatile fuel components are hydrocarbons.

* * * * *